United States Patent [19]
Yamasaki et al.

[11] Patent Number: 5,589,994
[45] Date of Patent: Dec. 31, 1996

[54] IMAGE RECORDING METHOD AND APPARATUS WITH REDUCED ERROR PROPAGATION

[75] Inventors: Tatsuo Yamasaki; Ikuo Okuma; Ken Onishi, all of Nagaokakyo, Japan

[73] Assignee: Mitsubishi Denki Kabushiki Kaisha, Tokyo, Japan

[21] Appl. No.: 109,723

[22] Filed: Aug. 19, 1993

[30] Foreign Application Priority Data

Aug. 21, 1992 [JP] Japan ................................ 4-222493
Jul. 29, 1993 [JP] Japan ................................ 5-208494

[51] Int. Cl.⁶ ............................ G11B 5/86; G11B 5/09
[52] U.S. Cl. ................................ 360/15; 360/53
[58] Field of Search ........................ 360/15, 53, 32, 360/8, 9.1

[56] References Cited

U.S. PATENT DOCUMENTS

| | | | |
|---|---|---|---|
| 5,084,788 | 1/1992 | Hatanaka et al. | 360/32 X |
| 5,267,094 | 11/1993 | Aoki | 360/15 X |
| 5,299,208 | 3/1994 | Blaum et al. | 371/38.1 |
| 5,309,292 | 5/1994 | Takakura | 360/32 X |

FOREIGN PATENT DOCUMENTS

| | | |
|---|---|---|
| 0408343 | 1/1991 | European Pat. Off. . |
| 0415699 | 3/1991 | European Pat. Off. . |
| 0461787 | 12/1991 | European Pat. Off. . |
| 60-133573 | 7/1985 | Japan . |
| 461070 | 2/1992 | Japan . |

*Primary Examiner*—Andrew L. Sniezek

[57] ABSTRACT

According to a first aspect of the invention, digital image data are recorded in the form of compressed codewords with check information and flags. The flags indicate codewords containing uncorrected errors. Each time the data are copied, error detection and correction are performed and the flags are updated to indicate any new uncorrectable errors that are detected. The flags can be used for error concealment, to avoid error miscorrection, and to permit the check information to be regenerated each time the data are copied. According to a second aspect of the invention, when image data are copied, the same check information is used to perform error detection and correction twice. Flags identifying uncorrected errors can be transferred from the first error-detecting-and-correcting process to the second.

10 Claims, 9 Drawing Sheets

IMAGE RECORDING METHOD AND APPARATUS WITH REDUCED ERROR PROPAGATION

BACKGROUND OF THE INVENTION

This invention relates to the recording and reproduction of compressed image data, more particularly to the copying and editing of compressed image data.

In transmission and processing, information is subject to various forms of degradation, the reduction of which has been a principal object of research into transmission and processing methods. Digitization is one means of avoiding data degradation. Digital information processing and transmission are now in a period of rapid development due to advances in semiconductor technology.

What applies generally to information transmission and processing also applies particularly to the recording and reproduction of image signals. In the past, analog image signals were processed by analog methods, then recorded in analog form. Various types of image degradation occurred in both the signal-processing and signal-recording steps. When a recorded image was repeatedly copied or edited, the amount of degradation would increase each time.

To avoid this degradation, much recent work has been done on systems that process and record image signals using completely digital methods. In theory, an image can be digitized, then recorded and reproduced with substantially no degradation, and repeated copying and editing should cause substantially no additional degradation, so systems for digitally recording and reproducing image signals hold great future promise. A representative system of this type is the digital video tape recorder, hereinafter referred to as the digital VTR.

In practice, even a digital VTR has a finite signal-to-noise ratio, which leads to a certain number of errors in the reproduced data. When such errors occur, they tend to result in pixels with drastically incorrect color or brightness values. An error-correcting code capable of reducing the error rate to an acceptable level is therefore an essential requirement in a digital VTR.

Data compression is also essential. An NTSC analog video signal, for example, is commonly converted to a digital signal by sampling at three or four times the color subcarrier frequency ($f_{SC}$) of 3.58 MHz. If the sampling rate is $3f_{SC}$ with eight bits per sample, the resulting data rate is 86 megabits per second (8×3×3.58 MHz), requiring about twenty times the bandwidth of the original analog signal. While digitization of an image signal can prevent degradation, it vastly increases the amount of information to be transmitted or recorded. To reduce the data rate, error-correcting encoding is therefore preceded by a separate compressive encoding step.

In a digital VTR, a third type of encoding, referred to as channel encoding, is also necessary in order to record the data on magnetic tape. A digital VTR accordingly has three encoders: a source encoder that digitizes and compresses the video signal; an error-correcting encoder that adds an error-correcting code to the compressed data; and a channel encoder that converts the output of the error-correcting encoder to a form suitable for magnetic recording. For reproducing recorded images, the digital VTR also has three decoders: a channel decoder that converts the signal read from the magnetic tape to a data signal; an error-correcting decoder that corrects errors in the data signal; and a source decoder that decompresses the corrected data signal and converts it back to an analog video signal.

The error-correcting encoder and decoder are necessarily limited in their error-correcting capability; uncorrectable errors occasionally occur. In copying and editing, if the reproduced data were to be decompressed and converted back to analog form, then redigitized and recompressed before being recorded again, the effect of uncorrectable errors would be magnified, and errors would tend to propagate into previously correct data, causing serious image degradation. This problem has been addressed in the prior art (e.g. Japanese Patent Kokai Publication 133573/1985) by copying and editing compressed data.

More specifically, when a tape is copied from machine A to machine B, the output of the error-correcting decoder in machine A (including both the compressed image data and error-correcting code) is fed to the channel encoder in machine B, bypassing the source decoder in machine A and the source encoder and error-correcting encoder in machine B. Any uncorrectable errors are therefore left as is, without being magnified by decompression and recompression.

Nevertheless, this scheme does not completely eliminate error propagation effects. Once an uncorrectable error occurs in the image data, it tends to breed further errors in future copies and edits by impairing the error-correcting ability of the error-correcting decoder, so that errors that would normally be correctable become uncorrectable. As the number of uncorrected errors grows, the error-correcting decoder also becomes prone to make mistakes by overlooking errors; or by miscorrecting errors, thereby introducing new errors itself. These mistakes moreover cause the error-correcting decoder to misinform the source decoder as to the presence or absence of errors. Thus when image data are repeatedly copied, errors can still propagate to the point where significant image degradation occurs.

SUMMARY OF THE INVENTION

It is accordingly an object of the present invention to prevent error propagation when digital image data are copied from one medium to another.

Another object of the invention is to avoid image degradation resulting from attempts to correct or reproduce digital image data containing uncorrectable errors.

According to a first aspect of the invention, digital image data are recorded in the form of compressed codewords together with check information and flags. The flags indicate codewords containing uncorrected errors. Each time the data are copied, the check information is used to detect and correct errors, and the flags are updated to indicate any new uncorrectable errors that are detected. The flags can be used for error concealment, or to avoid attempting to correct codewords that already contain uncorrectable errors. The flags also permit the check information to be regenerated each time the data are copied, thereby enhancing error-correcting capability.

According to a second aspect of the invention, when image data are copied, the check information is used to detect and correct errors, then the same check information is used to detect and correct errors again. Flag information generated in the first error-detecting-and-correcting process can be used to enhance the error-correcting capability of the second process, or to determine whether the second process needs to be performed.

DETAILED DESCRIPTION OF THE INVENTION

Embodiments of the invention will be described with reference to the attached drawings. These drawings illustrate the invention but do not restrict its scope, which should be determined solely from the appended claims.

Figure 1:
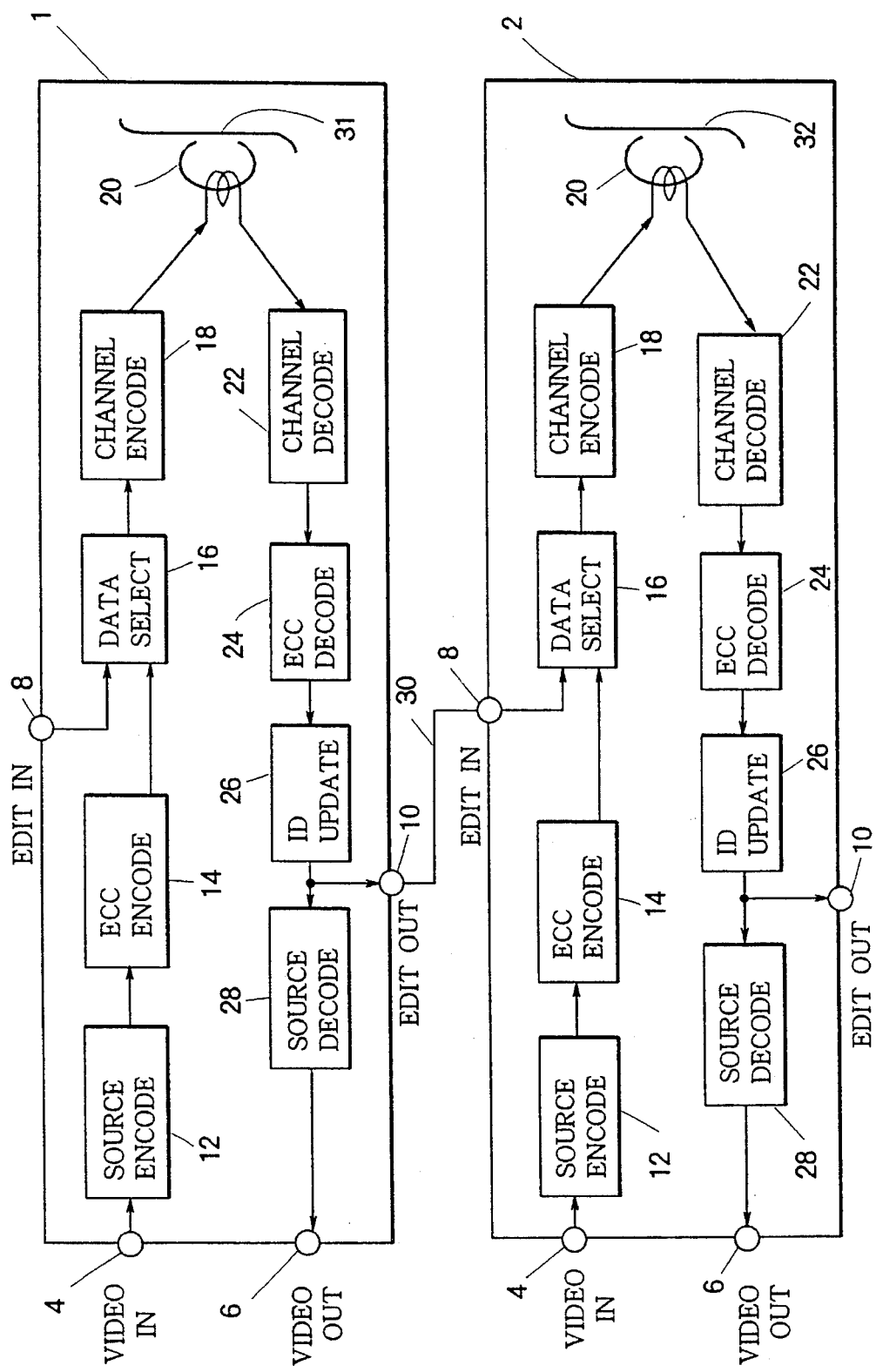
FIG. 1 is a block diagram of a novel digital VTR, showing two digital VTRs connected for copying or editing.

FIG. 1 shows two identical, novel digital VTRs 1 and 2 each having a video input terminal 4, a video output terminal 6, an edit input terminal 8, and an edit output terminal 10, and comprising a source encoder 12, an error-correcting encoder 14, a data selector 16, a channel encoder 18, a read/write head 20, a channel decoder 22, an error-correcting decoder 24, an ID update circuit 26, and a source decoder 28. The edit output terminal 10 of the first digital VTR 1 is shown coupled to the edit input terminal 8 of the second digital VTR 2 by cable 30 in order to copy image data from a first. magnetic tape 31 mounted in the first digital VTR 1 to a second magnetic tape 32 mounted in the second digital VTR 2.

The video input and output terminals 4 and 6 are for input and output of analog video signals. The edit input and output terminals 8 and 10 are for input and output of digital data.

The source encoder 12 digitizes the analog video signal received at the video input terminal 4 and compresses the digitized signal by well-known methods to generate compressed image data. Together with the compressed image data, the source encoder 12 outputs flags which will be used to indicate errors. The source encoder 12 initializes these flags by clearing them so that they indicate the absence of errors. The error-correcting encoder 14 rearranges the compressed image data and flags and adds check information to enable errors to be corrected later.

Figure 2:
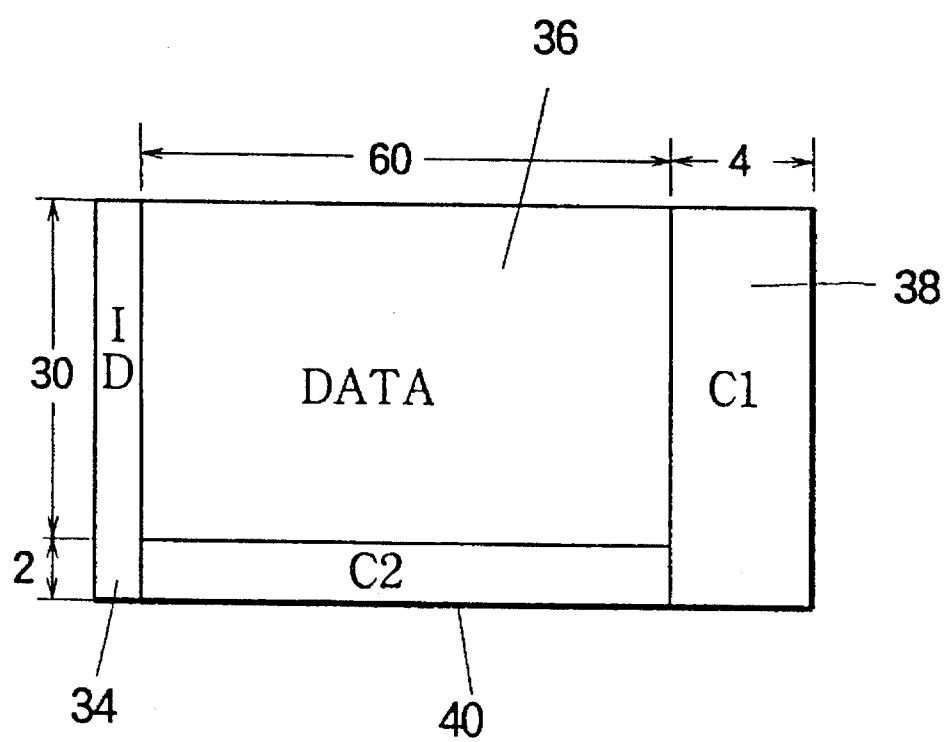
FIG. 2 illustrates a block error-correcting encoding scheme.

FIG. 2 shows an example of an encoding scheme that can be employed by the error-correcting encoder 14. Although the data are input and output in, for example, byte-serial form, they can be conveniently described as being arranged in rectangular blocks, each block having an ID field 34, a data field 36, a C1 check field 38, and a C2 check field 40. The ID field 34 comprises address information and the above-mentioned flags. The data field 36 is a sixty-by-thirty-byte rectangle comprising one thousand eight hundred bytes of compressed image data output by the source encoder 12. In keeping with customary error-correcting terminology, a byte of data will be referred to below as a symbol.

The C1 check field 38 comprises, for every sixty horizontally aligned symbols in the data field 36, four check symbols that, when combined with the sixty data symbols, form a C1 codeword of the well-known Reed-Solomon type. The C1 code parameters are (64, 60, 5), meaning that each codeword comprises sixty-four symbols, of which sixty are data symbols, and any two different codewords differ in at least five symbols. This code provides the capability to correct codewords with up to two erroneous symbols of unknown position, and to detect codewords with larger numbers of erroneous symbols. It also provides the capability to correct up to four erroneous symbols of known position, if there are no errors of unknown position.

The C2 check field 40 comprises similar check symbols for vertical codewords (referred to as C2 codewords) comprising thirty data symbols and two check symbols each. The C2 code parameters are (32, 30, 3). The C2 code provides the capability to correct one error of unknown position, or two errors of known position, and to detect codewords with larger numbers of errors.

Referring again to FIG. 1, the data selector 16 selects either the codeword data output by the error-correcting encoder 14 or digital data input from the edit input terminal 8 and provides the selected data to the channel encoder 18. The channel encoder 18 encodes the data to a form suitable for recording on magnetic tape, thereby generating channel data. The well-known non-return-to-zero (NRZ) or modified non-return-to-zero (NRZI) code, for example, can be employed as the channel code. The read/write head 20 records the channel data on the magnetic tape or, in playback mode, reads recorded data from the magnetic tape.

In playback mode the channel, decoder 22 decodes the data read by the read/write head 20 from the magnetic tape to produce blocks of data of the form shown in FIG. 2. The error-correcting decoder 24 corrects errors in these blocks as follows.

The error-correcting decoder 24 first examines each horizontal (C1) codeword in FIG. 2 and the corresponding flag information in the ID field 34. If a C1 codeword is flagged in the ID field 34 as already containing an uncorrected error, the error-correcting decoder 24 sets a corresponding erasure flag (not shown in the drawing) and does not attempt further error correction of that codeword. If the codeword is not already flagged, the error-correcting decoder 24 performs an error-correcting process on the sixty data symbols and four C1 check symbols. This process can have three outcomes: no errors were detected; one or two errors were detected and corrected; or more errors were detected and the errors could not be corrected. If the last of these outcomes occurs, the error-correcting decoder 24 again sets an erasure flag to indicate the presence of an uncorrected error. The erasure flags are internal to the error-correcting decoder 24, and are not (yet) recorded in the ID field 34.

Next, vertical (C2) codewords are examined and further error correction is performed, using the erasure flags and C2 check symbols. If the number of erasure flags is two, then by assuming that all remaining errors occur at the flagged positions, the error-correcting decoder 24 can correct up to two errors per C2 codeword. Even without using the erasure flags, the error-correcting decoder 24 can correct one error per C2 codeword. The possible outcomes of C2 error correction for each C2 codeword are therefore the same as before: no errors were detected, one or two errors were detected and corrected; or uncorrectable errors were detected.

If no detected but uncorrected errors remain after the C1 and C2 error-correcting steps, the ID update circuit 26 in FIG. 1 passes the data received from the error-correcting decoder 24 on without alteration, in the form shown in FIG. 2. If an uncorrected error remains, however, the update circuit 26 updates the flags in the ID field 34 in FIG. 2 according to the C1 erasure flags set by the error-correcting decoder 24, to indicate all C1 codewords now containing detected but uncorrected errors. The data output from the update circuit 26 are sent to the edit output terminal 10 and the source decoder 28.

Figure 3:
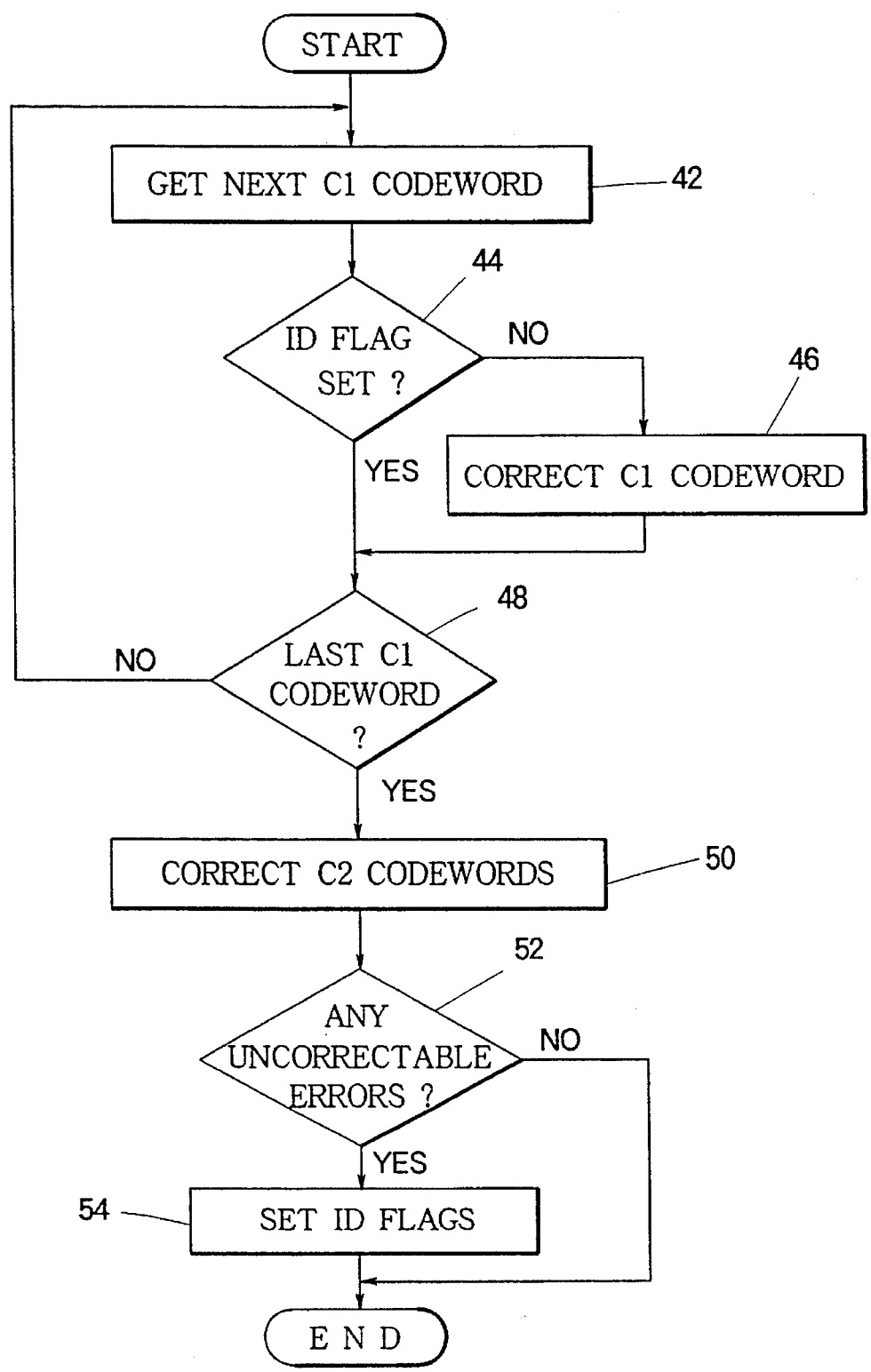
FIG. 3 illustrates the error-correcting decoding procedure and flag-updating procedure employed in FIG. 1.

FIG. 3 summarizes the process performed by the error-correcting decoder 24 and update circuit 26 in flowchart form. In the the first step 42, the error-correcting decoder 24 reads a C1 codeword. In the next step 44 the corresponding flag in the ID field is checked. If this flag is not set, in the next step 46 the C1 error-correcting procedure is carried out. The above steps are repeated on successive C1 codewords until the last C1 codeword has been processed, as determined in step 48. Then in the next step 50 the C2 error-correcting process is executed. These steps are performed by the error-correcting decoder 24. The next step 52 is performed by the update circuit 26. In this step 52, if no uncorrected errors were left after C1 and C2 error correction, the process ends. If any uncorrected errors are still present, then in the final step 54, the ID flags are updated to indicate these errors.

When the source decoder 28 in FIG. 1 receives a corrected code block from the update circuit 26, it checks the ID field 34 and decompresses the data in the data field 36, performing the reverse of the process performed by the source encoder 12. Preferably, data are decompressed only if the flags in the ID field indicate the data to be free of uncorrected errors. If a flag indicates an uncorrected error, the source decoder 28 preferably executes an error concealment process instead of decompressing the erroneous data. For example, the source decoder 28 can conceal the error by substituting data interpolated from the preceding and following image frames. Finally, the source decoder 28 converts the decompressed or interpolated digital data to an analog signal, which is output from the video output terminal 6.

Next the operations of recording, reproducing, and editing or copying image data will be described.

To record, for example, a broadcast television program, the received analog video signal is input at the video input terminal 4, then converted to compressed digital data by the source encoder 12. The error-correcting encoder 14 adds C1 and C2 check symbols as shown in FIG. 2. At this point the flags in the ID field 34 are all cleared, indicating no uncorrected errors. The data selector 16 feeds the data output from the error-correcting encoder 14 to the channel encoder 18 for channel encoding, and the read/write head 20 records the encoded data on the magnetic tape.

To reproduce the recorded program, the read/write head 20 reads the recorded data from the magnetic tape. The channel decoder 22 decodes the data to the form shown in FIG. 2 and the error-correcting decoder 24 detects and corrects errors caused, for example, by tape defects. The update circuit 26 sets flags in the ID field 34 to indicate any uncorrected errors. The source decoder 28 decompresses error-free data, interpolates other data, and converts the resulting image data to an analog video signal which is output from the video output terminal 6 to, for example, a raster-scanned video display.

To copy image data from the first magnetic tape 31 in FIG. 1 to the second magnetic tape 32, the first and second digital VTRs 1 and 2 are coupled by the cable 30. The read/write head 20, channel decoder 22, error-correcting decoder 24, and update circuit 26 in the first digital VTR 1 read and decode the image data from the first magnetic tape 31 and update the ID flags as described above. The resulting codeword data, which are still in the form shown in FIG. 2, are sent from the edit output terminal 10 of the first digital VTR 1 via the cable 30 to the edit input terminal 8 of the second digital. VTR 2. The data selector 16 in the second digital VTR 2 receives and selects these data, which it feeds to the channel encoder 18. The channel encoder 18 and read/write bead 20 record the data on the second magnetic tape 32.

Editing is carried out by combining the reproducing and copying operations described above to locate desired images on the first magnetic tape 31 and copy these images to desired locations on the second magnetic tape 32.

A complex editing process may involve repeated copying of an image from one tape to another until the intended result is achieved. Even simple copying may also be performed repeatedly, the contents of a first tape being copied to a second tape, then from the second tape to a third tape and so on. It is in this process of repeated copying that the invention is effective in inhibiting error propagation.

Figure 4:
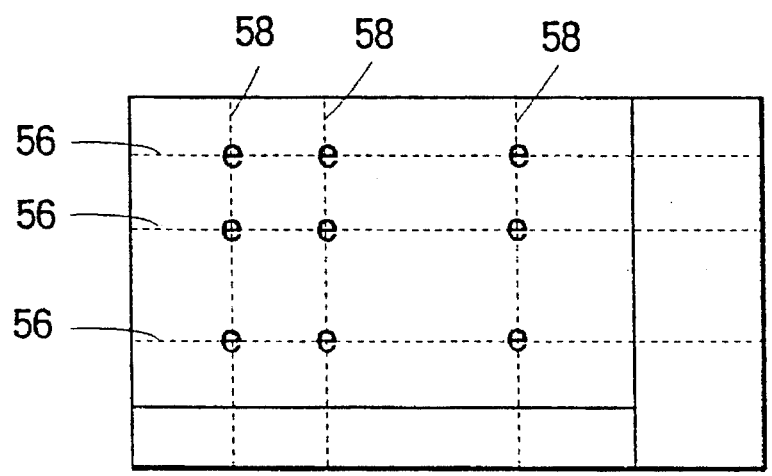
FIG. 4 illustrates possible errors occurring when compressed digital image data are read.

Referring for example to FIG. 4, suppose that when a certain block of compressed image data is copied, errors occur at the locations marked by the letter "e." Given the encoding scheme described above, a codeword with three errors, such as the C1 codewords 56 and C2 codewords 58, cannot be corrected, but the presence of the uncorrectable errors "e" can be detected. The three C1 codewords 56 are accordingly marked with ID flags indicating that they contain uncorrected errors.

Figure 5:
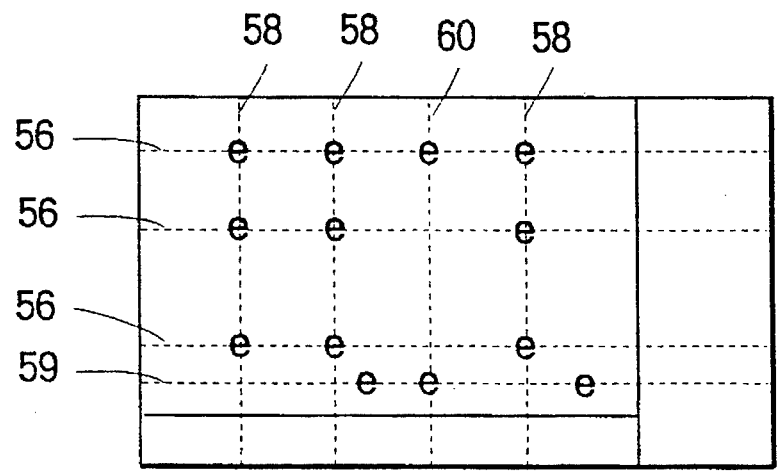
FIG. 5 illustrates further errors occurring when the same data are recorded and read again.

Referring to FIG. 5, suppose that when the same block is copied again, further errors occur at the four additional points marked by the letter "e." Since the C1 codewords 56 are already flagged as containing uncorrected errors, no further attempt is made to correct these codewords. A fourth C1 codeword 59 is also found to contain uncorrectable errors ("e") and is marked with an erasure flag. Two of these errors can be corrected in the C2 error-correcting step, which can correct one error of unknown position per C2 codeword. The two new errors in C2 codeword 60 are uncorrectable, however, because it is not possible to know in which of the four C1 codewords marked with erasure flags these errors occur. Since the C2 error-correcting process was unable to correct all errors, the ID flags are updated to indicate that all four of the C1 codewords 56 and 59 contain uncorrected errors.

Without the novel flags, the error-correcting decoder 24 would attempt to correct all the C1 codewords in FIG. 5, including the codeword now containing four errors. Execution of the C1 error-correcting step on a codeword containing four errors involves a heightened risk of miscorrection, resulting in the codeword being considered as correct when it is not, and possibly in the introduction of further errors. Such miscorrection has a weakening effect on C2 error correction because the miscorrected codeword is not flagged with an erasure flag. Since fewer errors can be corrected in the C2 error-correcting step, more errors are recorded; if data are copied repeatedly, miscorrection thus becomes a serious source of error propagation. Moreover, when images are reproduced from data corrupted by miscorrections, the source decoder 28 may mistakenly treat defective data as correct, decompress the defective data, and reproduce images with highly noticeable degradation.

Figure 6:
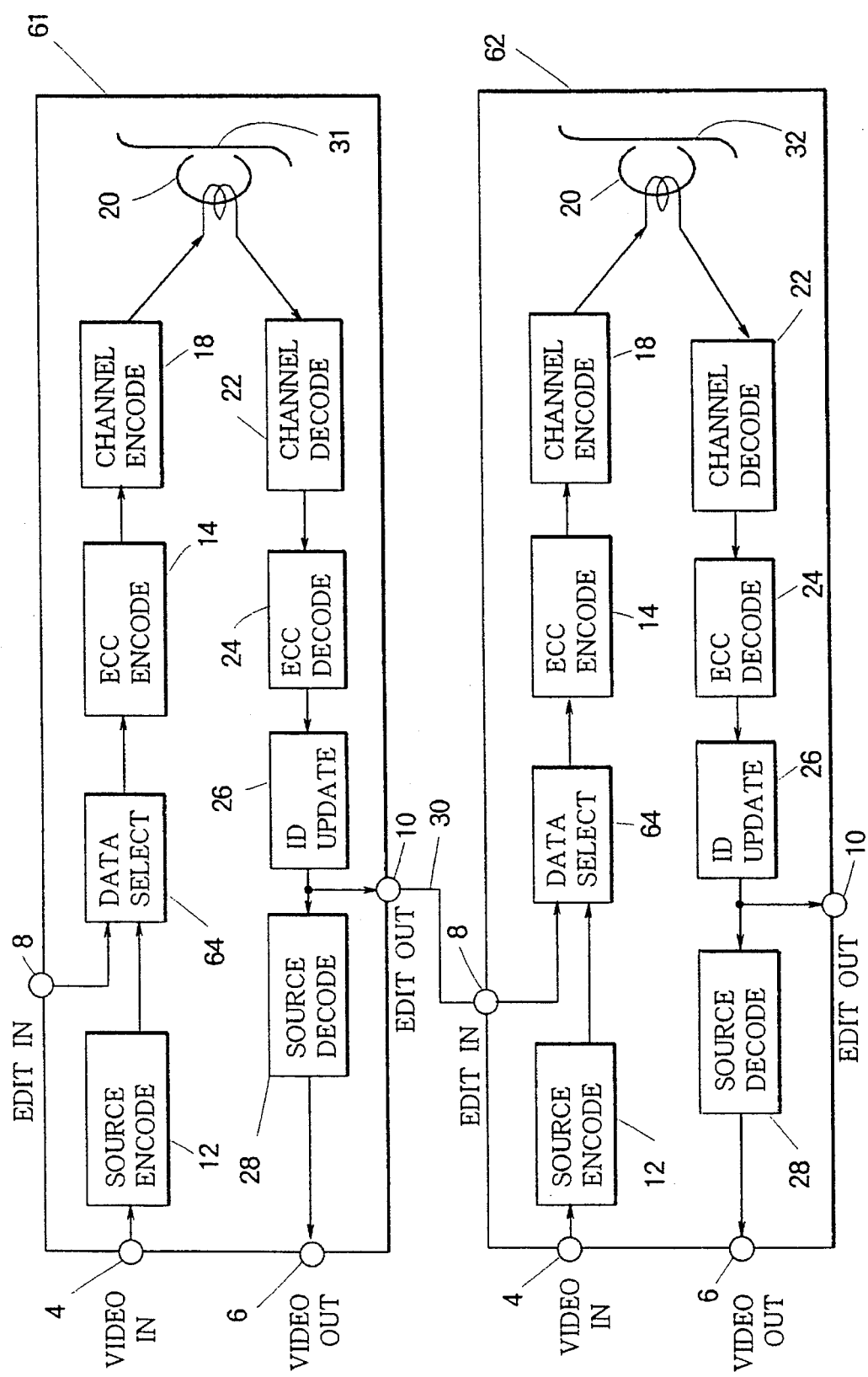
FIG. 6 is a block diagram of another novel digital VTR, again showing two digital VTRs connected for copying or editing.

FIG. 6 shows another pair of novel digital VTRs 61 and 62, in which the positions of the data selector and error-correcting encoder are interchanged and the ID flags are used in a different way. The data selector 64 in each VTR now selects data input from the edit input terminal 8 or source encoder 12, and outputs the selected data to the error-correcting encoder 14. The output of the error-correcting encoder 14 is coupled directly to the channel encoder 18. Also, after detecting and correcting errors, the error-correcting decoder 24 discards the C1 and C2 check symbols, so that only the data field, ID field, and erasure flags are sent to the ID update circuit 26. In editing or copying, this reduces the amount of information that has to be transferred from the first digital VTR 61 to the second digital VTR 62.

The digital VTR in FIG. 6 operate like the ones in FIG. 1 except that data are always recorded with correct check symbols, and C1 error correction is carried out even on codewords flagged as containing uncorrected errors. When an image is copied from the first magnetic tape 31 to the second magnetic tape 32, the error-correcting encoder 14 in the second digital VTR 62 generates new check symbols that encode correct check information for the image data symbols being copied, even if the image data symbols themselves are incorrect. Uncorrected data errors are therefore identified only by the ID flags; the new check symbols indicate that the data are correct.

The update circuit 26 operates in the same way as before. If the error-correcting decoder 24 is unable to correct all errors in a block, then all erasure flags set for C1 codewords in that block are transferred to the ID field. 34. If a C1 codeword is flagged in the ID field 34 as already containing an uncorrected error, the update circuit 26 leaves the ID flag set, even if the error-correcting decoder 24 does not find an uncorrectable error in the codeword this time. This ease will frequently occur, because of the regeneration of the check symbols.

An advantage of the novel digital VTRs 61 and 62 in FIG. 6 is that by regenerating the check symbols at every copy or edit operation, they maintain the full error-correcting strength of the error-correcting code. Uncorrectable errors are flagged in the ID field, then treated as correct, so that they do not impair the ability of the error-correcting decoder 24 to cope with errors in future copies or edits.

Referring again to FIGS. 4 and 5, if the errors indicated in FIG. 4 occur when image data are copied by the digital VTRs 61 and 62, the errors will be uncorrected, but the check symbols will be adjusted to fit the actual data symbol values. Then if the new errors indicated in FIG. 5 occur when the data are copied again, these new errors will all be correctable. The new error occurring at the intersection of C2 codeword 60 with the first C1 codeword 56 will be corrected in the C1 error-correcting step, because it is regarded as the only error in that C1 codeword. The three new errors in C1 codeword 59 will be corrected in the C2 error-correcting step, because in each case there is now only one error per C2 codeword. All errors occurring in the second copying of this block are thus corrected.

The old errors occurring at the intersections of C1 codewords 56 with C2 codewords 58 will be left as is, because the error-correcting decoder 24 now considers them to be correct. However, the C1 codewords 56 continue to be marked with ID flags, which will enable the source decoder 28 to identify their data as defective and carry out appropriate error concealment when the image is reproduced.

In FIG. 6, if P is the uncorrectable symbol error rate when a tape is copied once, then the rate after two copies or edits will be substantially 2P, and the rate after N copies or edits will be substantially NP. Even ten successive copies or edits, for example, will raise the error rate by only one order of magnitude. The error-correcting code can easily be designed to provide a margin of one order of magnitude in the error rate.

Figure 7:
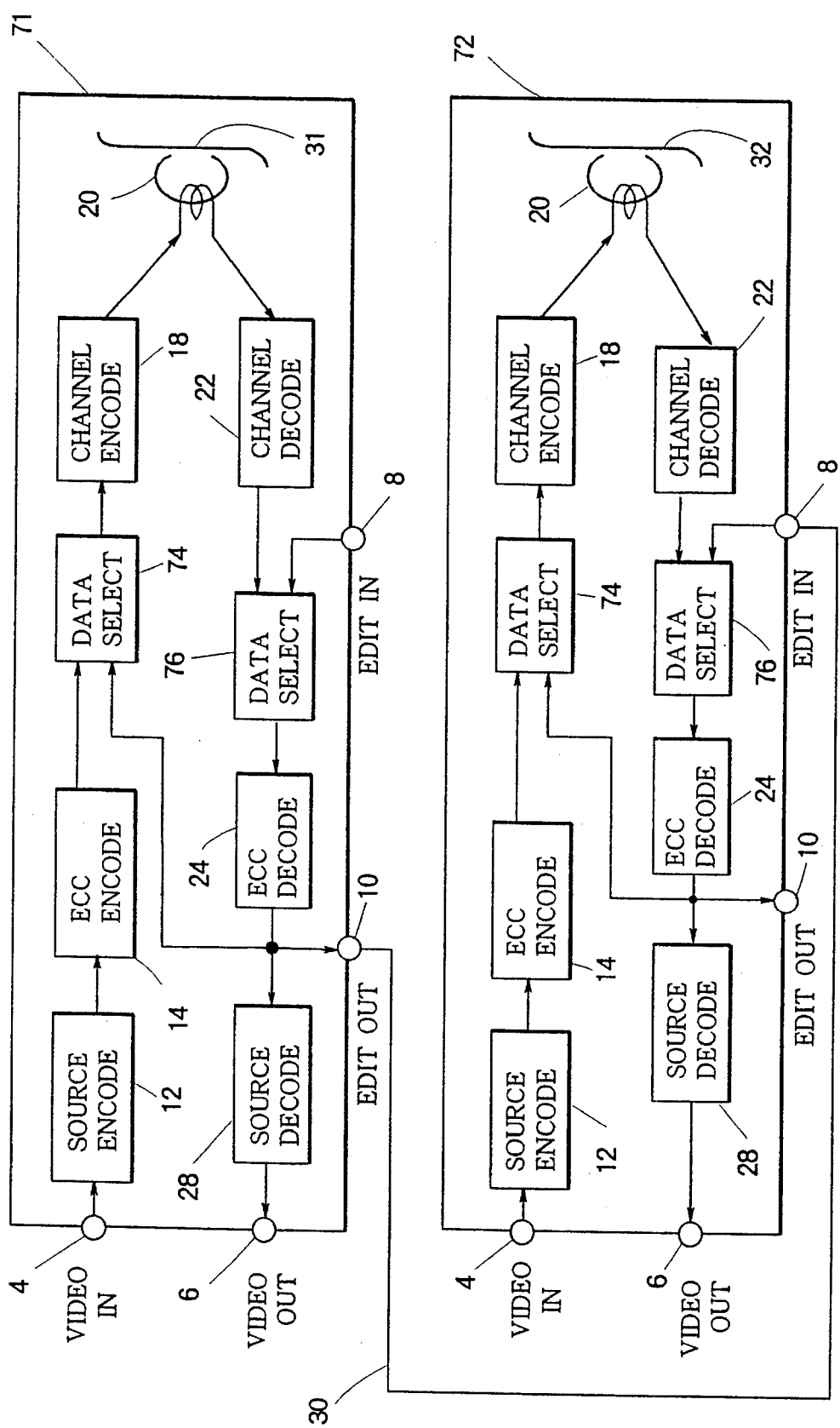
FIG. 7 is a block diagram of yet another novel digital VTR, once again showing two digital VTRs connected for copying or editing.

FIG. 7 shows yet another pair of novel digital VTRs 71 and 72. Elements common to the digital VTR in FIGS. 1 and 6 have the same reference numerals. Instead of the update circuit 26 in FIGS. 1 and 6, the digital VTRs in FIG. 7 have an extra data selector. The data selector 74 disposed between the error-correcting encoder 14 and channel encoder 18 will be referred to below as the second data selector. The data selector 76 disposed between the channel decoder 22 and error-correcting decoder 24 will be referred to as the first data selector.

The first data selector 76 selects either the digital data input at the edit input terminal 8 or the codeword data output from the channel decoder 22 and provides the selected data to the error-correcting decoder 24. The corrected codeword data output from the error-correcting decoder 24 are supplied to the edit output terminal 10, the source decoder 28, and the second data selector 74. The second data selector 74 selects either the codeword data received from the error-correcting decoder 24 or the codeword data received from the error-correcting encoder 14, and provides the selected codeword data to the channel encoder 18.

Figure 8:
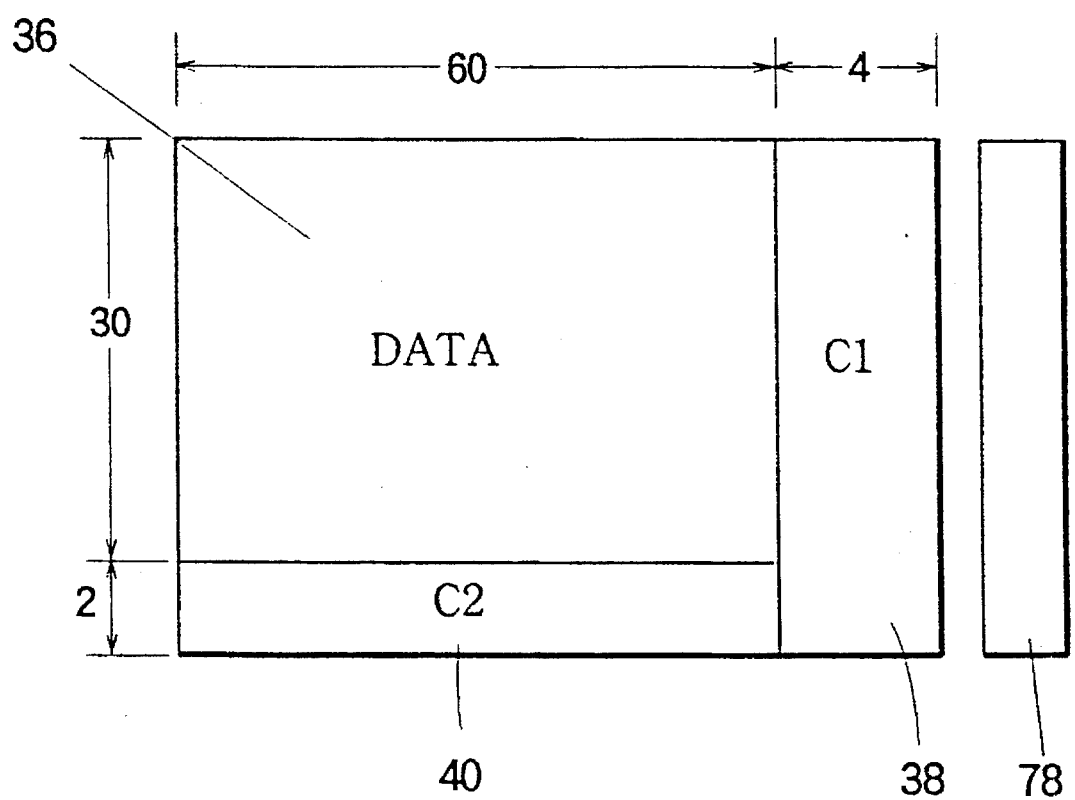
FIG. 8 illustrates the block error-correcting encoding scheme used in FIG. 7.

The error-correcting decoder 24 in FIG. 7 operates as in FIGS. 1 and 6 except that it does not make use of ID flags to indicate uncorrected errors. The code format 15, for example, as shown in FIG. 8, comprising a data field 36, C1 check field 38, and C2 check field 40. Also shown in FIG. 8 is the C1 erasure field 78 which contains erasure flags internal to the error-correcting decoder 24.

Image recording and reproducing operations in FIG. 7 are the same as in FIGS. 1 and 6, the first data selector 76 selecting the output of the channel decoder 22 and the second data selector 74 selecting the output of the error-correcting encoder 14.

In copying from the first magnetic tape 31 to the second magnetic tape 32, the edit output terminal 10 of the first digital VTR 71 is coupled by a cable 30 to the edit input terminal 8 of the second digital VTR 72, the first data selector 76 in the first digital VTR 71 selects the output of the channel decoder 22, the first data selector 76 in the second digital VTR 72 selects the data input from the edit input terminal 8, and the second data selector 74 in the second digital VTR 72 selects the output from the error-correcting decoder 24. In the first digital VTR 71, the data being copied thus pass from the read/write head 20 through the channel decoder 22, first data selector 76, and error-correcting decoder 24 to the edit output terminal 10. In the second digital VTR 72, the data then pass from the edit input terminal 8 through the first data selector 76, error-correcting decoder 24, second data selector 74, and channel encoder 18 to the read/write head 20. As a result, error detection and correction are performed twice, once by the error-correcting decoder 24 in the first digital VTR 71 and once by the error-correcting decoder 24 in the second digital VTR 72, using the same check symbols both times. This double correction results in enhanced error-correcting capability, as described next.

Figure 9A:
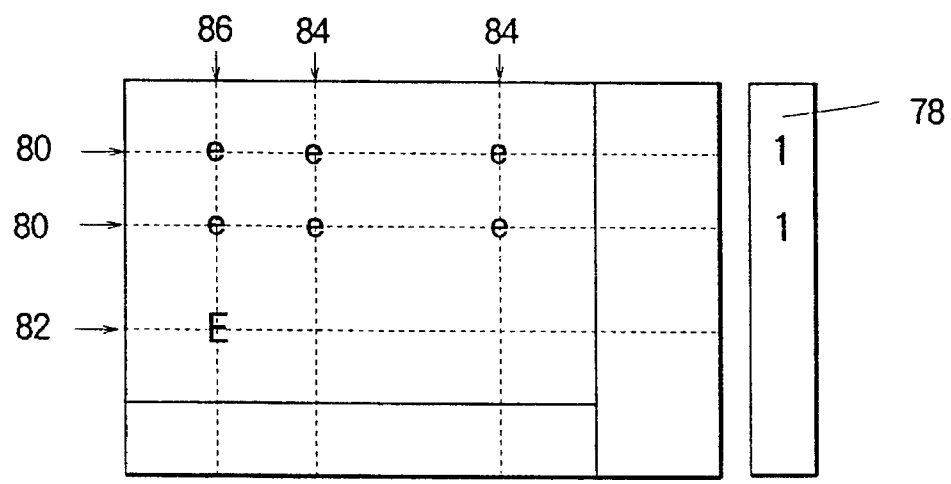
FIG. 9A illustrates errors occurring in data read from a magnetic tape by the first digital VTR in FIG. 7.

Referring to FIG. 9A, suppose that when data are read from the first magnetic tape 31 in the first digital VTR 71, errors occur at the points indicated by the letters "e" and "E." Suppose further that the errors indicated by "e" are detected by the error-correcting decoder 24 in time first digital VTR 71 in the C1 error-correcting step, but the error indicated by "E" is not. Failure to detected an error can occur, for example, when the error pattern is identical to the original codeword. As a result, none of the errors marked "e"or "E" are corrected in the C1 error-correcting step. Two C1 codewords 80 are marked with erasure flags in the C1 erasure field 78, but the C1 codeword 82 is not so marked.

The two C2 codewords 84 contain two errors apiece; these errors are corrected in the C2 error-correcting step, the information given by the erasure flags in the C1 erasure field 78 being used to identify the positions of the errors. The C2 codeword 86 contains three errors, so it is not correctable.

Figure 9B:
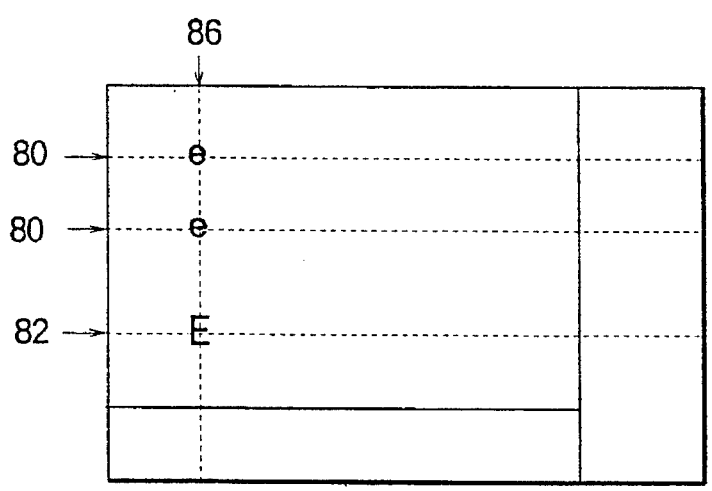
FIG. 9B illustrates partial correction of these errors in the first digital VTR in FIG. 7.

FIG. 9B shows the data output from the first digital VTR 71. The three C1 codewords 80 and 82 now contain one error each, these errors occurring in the C2 codeword 86. The other errors that were present in FIG. 9A have already been corrected.

The data in FIG. 9B are input via the edit input terminal 8 and first data selector 76 in the second digital VTR 72 to the error-correcting decoder 24 in the second digital VTR 72, and the C1 and C2 error-correcting steps are now repeated. In the C1 error-correcting step, the three C1 codewords 80 and 82 are corrected because they contain only one error each. This leaves no errors to be corrected by the C2 error-correcting step.

Figure 9C:
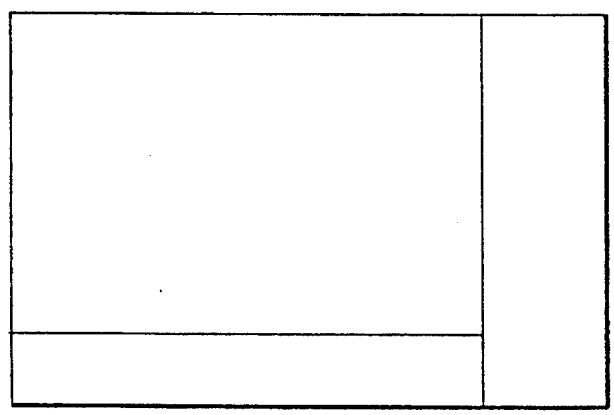
FIG. 9C illustrates further correction of these errors in the second digital VTR in FIG. 7.

FIG. 9C shows the data output from the error-correcting decoder 24 in the second digital VTR 72. All errors have been removed, so the channel encoder 18 in the second digital VTR 72 is able to record error-free data on the second magnetic tape 32.

The same effect would be obtained if the error "E" were not overlooked but resulted from miscorrection in the C1 error-correcting step in the first digital VTR 71. Moreover, there are many other possible sets of errors that can be completely corrected by performing C1 and C2 error correction twice, using the error-correcting decoders in both the first and second digital VTRs 71 and 72. Furthermore, there are still more eases in which the second C1-C2 error-correcting process carried out in the second digital VTR 72 reduces the number of errors, even though it does not correct all errors. In all such cases, the second error-correcting process enhances the ability of the digital VTRs 71 and 72 to copy or edit image data without introducing noticeable image degradation.

Figure 10A:
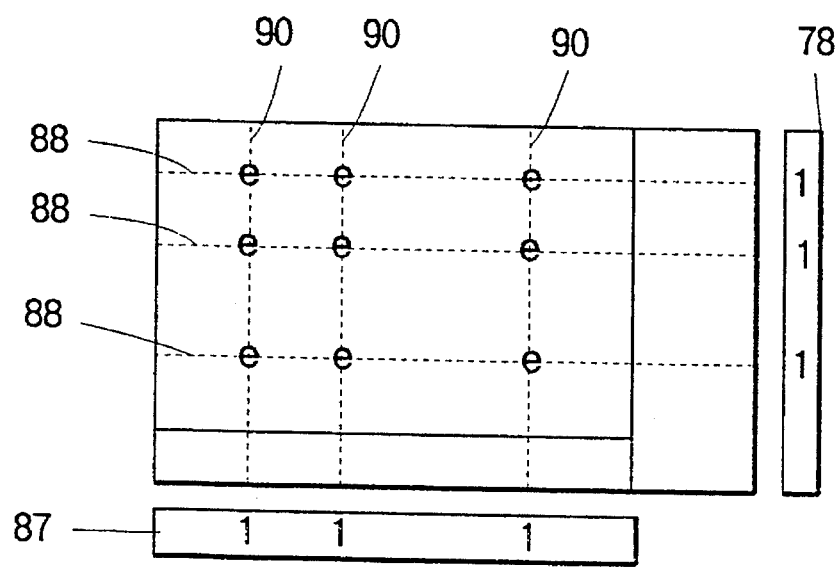
FIG. 10A illustrates uncorrectable errors occurring in data read from a magnetic tape by the first digital VTR in FIG. 7.

This ability can be enhanced still further by having the error-correcting decoder 24 in the first digital VTR 71 inform the error-correcting decoder 24 in the second digital VTR 72 as to which C2 codewords contain uncorrected errors. The error-correcting decoder 24 in the second digital VTR 72 can use this information in the C1 error-correcting step. Referring to FIG. 10A, the error-correcting decoder 24 now maintains a C2 erasure field 87 in addition to the C1 erasure field 78, and outputs the contents of the C2 erasure field 87 to the edit output terminal 10 together with the data and check symbols.

Suppose that data read from the first magnetic tape 31 in the first digital VTR 71 contain errors at the locations marked "e" in FIG. 10A. As explained previously, the error-correcting decoder 24 in the first digital VTR 71 is unable to correct any of these errors, but it marks the three C1 codewords 88 with erasure flags in the C1 erasure field 78, and marks the three C2 codewords 90 with erasure flags in the C2 erasure field 87.

When the error-correcting decoder 24 in the second digital VTR 72 receives the data shown in FIG. 10A, it also receives the flags in the C2 erasure field 87. The C1 error-correcting step has the capability to correct up to four errors of known position. Since each C1 codeword 88 contains only three errors, and since the positions of these errors are identified by the C2 erasure field 87, all of these errors "e" are now correctable.

Figure 10B:
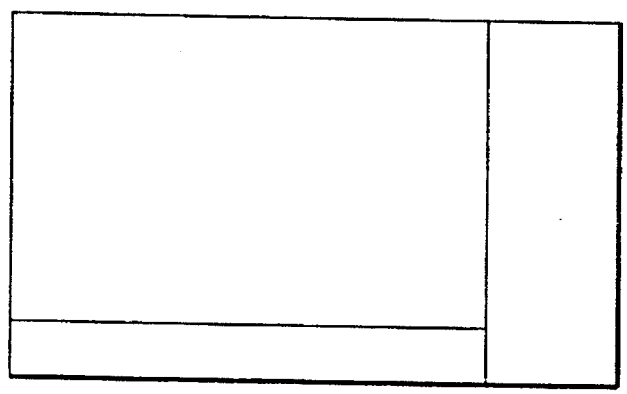
FIG. 10B illustrates correction of these errors by the second digital VTR in FIG. 7.

FIG. 10B shows the data after the C1 error-correcting step performed in the second digital VTR 72. All errors have been corrected, leaving no errors to be detected or corrected in the C2 error-correcting step. Once again the channel encoder 18 in the second digital VTR 72 is able to record error-free data. Needless to say, FIGS. 10A and 10B show just one of many cases in which the provision of the C2 erasure field 87 from the first digital VTR 71 to the second digital VTR 72 enables the correction of otherwise uncorrectable errors.

The C2 erasure field 87 in FIG. 10A can be used advantageously in other ways as well. For example, if all flags in the C2 erasure field 87 are cleared, indicating that all errors have already been corrected in the first digital VTR 71, then the error-correcting steps in the second digital VTR 72 can be skipped, thereby speeding up the copying process. Alternatively, the contents of the C2 erasure field 87 can be output to the edit output terminal 10 only when at least one error is still present. If the second digital VTR 72 does not receive the C2 erasure field contents, it knows that no errors are present and can skip the error-correcting process.

Although the ID field was omitted from the data format shown in FIG. 8, it is of course possible for the digital VTRs 71 and 72 in FIG. 7 to record on the magnetic tape the same type of ID field 34 as in FIG. 2, with flags indicating uncorrected errors, and to use these flags for error concealment. In that case, the second data selector 74 can be disposed between the source decoder 12 and error-correcting encoder 14 and the check symbols can be regenerated at every copy, as in the digital VTRs 61 and 62 in FIG. 6. Furthermore, in FIG. 6 the C1 and C2 check symbols can be discarded by the data selector 64 instead of by the error-correcting decoder 24, for compatibility with prior-art digital VTRs.

Those skilled in the art will realize that further modifications can be made to the digital VTRs shown in the drawings without departing from the scope of the invention as set forth below.

What is claimed is:

1. A method of copying compressed digital data from a first medium to a second medium, comprising the steps of:

(a) reading, from said first medium, compressed digital data comprising codewords having check fields and flags, said flags identifying codewords with uncorrected errors;

(b) using said check fields to correct errors in said codewords;

(c) using said check fields to detected uncorrectable errors in said codewords;

(d) updating said flags to identify codewords in which uncorrectable errors were detected in said step (c); and (e) recording said compressed digital data as read in said step (a) and corrected in said step (b) on said second medium, together with the check fields used in said steps (b) and (c) and said flags as updated in said step (d).

2. The method of claim 1, wherein said steps (b) and (c) are not carried out on codewords already identified by said flags as containing uncorrected errors.

3. The method of claim 1, Wherein said codewords comprise C1 codewords and C2 codewords, errors in said C1 codewords are detected and corrected before errors in said C2 codewords, and said flags identify C1 codewords having uncorrected errors.

4. The method of claim 1, wherein said first medium and said second medium are magnetic tape media.

5. A method of copying compressed digital data from a first medium to a second medium, comprising the steps of:

(a) reading, from said first medium, compressed digital data comprising codewords having check fields and flags, said flags identifying codewords with uncorrected errors;

(b) using said check fields to correct errors in said codewords;

(c) using said check fields to detected uncorrectable errors in said codewords;

(d) updating said flags to identify codewords in which uncorrectable errors are newly detected;

(e) removing said check fields from said codewords after said flags have been updated; and (f) generating new check fields for said codewords; and (g) recording the compressed digital data as read in said step (a) and corrected in said step (b) on said second medium, together with said new check fields and said flags as updated in said step (d).

6. The method of claim 5, wherein said steps (b) and (c) are not carried out on codewords already identified by said flags as containing uncorrected errors.

7. The method of claim 5, wherein said codewords comprise C1 codewords and C2 codewords, errors in said C1 codewords are detected and corrected before errors in said C2 codewords, and said flags identify C1 codewords having uncorrected errors.

8. The method of claim 5, wherein said first medium and said second medium are magnetic tape media.

9. A method of copying compressed digital data from a first medium to a second medium, comprising the steps of:

(a) reading, from said first medium, compressed digital data comprising codewords having check fields and flags, said flags identifying codewords with uncorrected errors, each of said check fields including a first check field and a second check field, said first check field forming part of a C1 codeword, and said second check field forming part of a C2 codeword;

(b) correcting errors in said C1 codewords using said first check field;

(c) detecting uncorrectable errors in said C1 codewords;

(d) setting internal erasure flags corresponding to each C1 codeword having uncorrectable errors based on output at step (c);

(e) correcting errors in said C2 codewords using said second check field and said internal erasure flags;

(f) clearing ones of said internal erasure flags corresponding to uncorrectable errors in said C1 codewords corrected in step (e);

(g) updating said flags based on said internal erasure flags which remain set after said step (f); and (h) recording said compressed digital data as read in said step (a) and corrected in said steps (b) and (e) on said second medium, together with the check fields used in said steps (b) and (e) and said flags as updated in said step (g).

10. A method of copying compressed digital data from a first medium to a second medium, comprising the steps of:

(a) reading, from said first medium, compressed digital data comprising codewords having check fields and flags, said flags identifying codewords with uncorrected errors, each of said check fields including a first check field and a second check field, said first check field forming part of a C1 codeword, and said second check field forming part of a C2 codeword;

(b) correcting errors in said C1 codewords using said first check field;

(c) detecting uncorrectable errors in said C1 codewords;

(d) setting internal erasure flags corresponding to each C1 codeword having uncorrectable errors based on output at step (c);

(e) correcting errors in said C2 codewords using said second check field and said internal erasure flags;

(f) clearing ones of said internal erasure flags corresponding to uncorrectable errors in said C1 codewords corrected in step (e);

(g) updating said flags based on said internal erasure flags which remain set after said step (f);

(h) removing said check fields from said codewords after said flags have been updated;

(i) generating new check fields for said codewords; and (j) recording the compressed digital data as read in said step (a) and corrected in said steps (b) and (e) on said second medium, together with said new check fields and said flags as updated in said step (g).

* * * * *